April 30, 1968 W. E. ARNOLD 3,381,289

READ-OUT INDICATOR CIRCUITRY

Filed June 8, 1965 2 Sheets-Sheet 1

WITNESSES
Theodore F. Wrobel
James F. Young

INVENTOR
Wayne E. Arnold
BY
ATTORNEY

April 30, 1968  W. E. ARNOLD  3,381,289
READ-OUT INDICATOR CIRCUITRY
Filed June 8, 1965  2 Sheets-Sheet 2

United States Patent Office 3,381,289
Patented Apr. 30, 1968

3,381,289
READ-OUT INDICATOR CIRCUITRY
Wayne E. Arnold, Franklin Township, Murrysville, Pa., assignor to Westinghouse Electric Corporation, Pittsburgh, Pa., a corporation of Pennsylvania
Filed June 8, 1965, Ser. No. 462,358
9 Claims. (Cl. 340—324)

ABSTRACT OF THE DISCLOSURE

The present disclosure relates to an indicator system for displaying visual information. An indicator unit is provided including a plurality of display elements, which may comprise light bulbs, arranged in a matrix to be selectively energized and provide the desired visual display. Switching devices, such as controlled rectifiers, are included in the matrix to energize selectively the indicator elements of the indicator unit. Deenergization of the display elements is accomplished by the use of other switching devices and storage elements which selectively reverse bias the matrix switching devices to turn them off. A plurality of indicator units may be interconnected, with the particular indicator unit being selected by a matrixing network and the visual display elements of that unit being energized in accordance with the desired information to be displayed.

---

The present invention relates to read-out indicator circuitry, and more particularly to indicator circuitry for use in computer control systems wherein a large number of read-out indicators are required.

A requirement of many control systems, especially digital computer control systems, is that of providing visual read-out indicators. Many control systems require as many as several hundred read-out indicator units, each including at least ten indicator lights. To present the information to be read-out from the control system in a visual form, it is necessary that the appropriate indicator light or lights be energized and be maintained in this state until it is desired to change the read-out display. When a large number of indicator units are utilized, it is necessary to select first the desired indicator unit out of an array of indicators and then to select the appropriate lights of that indicator unit. In order to accomplish the selection, energization and de-energization of the chosen indicator unit and the inductor lights therein, a large number of electrical components are normally required. As the number of indicator units increase, the cost of components for the system may become excessive, especially in a computer control system utilizing large numbers of read-out indicators.

It is therefore an object of the present invention to provide new and improved read-out indicator circuitry.

It is a further object of the present invention to provide a new and improved read-out indicator incorporating novel energization and de-energization control means therein.

It is a further object of the present invention to provide new and improved read-out indicator circuitry which is readily adaptable to include a plurality of indicator units.

It is a further object of the present invention to provide new and improved read-out indicator circuitry readily adaptable for use with a plurality of indicator units in which matrixing techniques are utilized for the selection of the individual indicator units to minimize the number of components required.

It is a further object of the present invention to provide new and improved indicator circuitry for use with a plurality of indicator units and in which new and improved selection circuitry is provided for the selection of the indicator units.

In its broad context the present invention provides indicator circuitry including an indicator unit having a plurality of visual display elements arranged in an array to be selectively energized and provide desired visual information to be read-out. Switching devices are included in the array to energize selectively the indicator elements. Deenergization of the visual display elements is accomplished by other switching devices included in the array. A large number of indicator units may be interconnected, with the particular indicator unit being selected by a matrixing network and the visual display elements of that unit being energized in accordance with the desired read-out information.

These and other objects and advantages of the present invention will become more apparent when considered in view of the following specification and drawings, in which.

Figure 1:
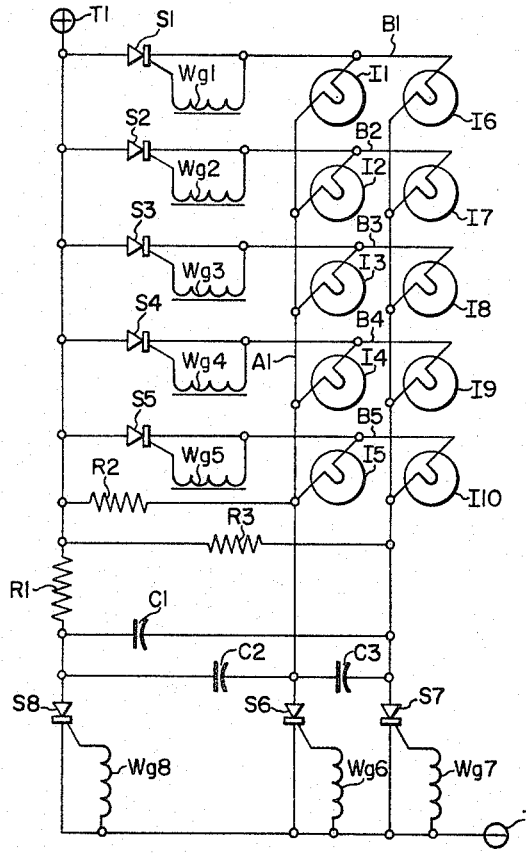
FIGURE 1 is a schematic diagram of a read-out indicator unit of the present invention.

Referring now to FIGURE 1, an indicator unit is shown including ten visual display elements I1 through I10. The visual display elements may, for example, comprise light bulbs which when electrically energized will produce a visual output. The display elements I1 through I10 are shown connected in a five by two matrix, with the element I1 through I5 connected in a first column and the elements I6 through I10 connected in a second column. The elements I1–I6, I2–I7, I3–I8, I4–I9, and I5–I10 are respectively connected in five rows. One end of each of the visual display elements I1 through I5 is connected through a line A1 and one end of each of the control elements I6 through I10 is connected through a line A2. The other end in each of the rows of display elements are connected, respectively, through lines B1 through B5; namely, the line B1 connects the elements I1–I6, the line B2 connects the elements I2–I7, the line B3 connects the elements I3–I8, the line B4 connects the elements I4–I9 and the line B5 connects the elements I5–I10.

To supply energizing current to each of the visual display elements I1–I10, a source of positive potential, not shown, is connected to a terminal T1. Which row of the visual display matrix is to be energized is controlled by five gate controlled semiconductor switches S1–S5. Each of the switches S1–S5 has its anode electrode connected at the terminal T1, with the respective cathode electrodes being connected to the row lines B1 through B5. Thus, as is shown in FIGURE 1, the switches S1, S2, S3, S4 and S5 are connected, respectively, between the terminal T1 and the row lines B1, B2, B3, B4 and B5.

Connected between the column lines A1 and A2 and a terminal T2, which may be connected to a source negative potential, not shown, or may be connected at ground potential, are a pair of gate controlled semiconductor switching devices S6 and S7. The gate controlled semiconductor devices S1–S7 may, for example, comprise a well known three terminal semiconductor device such as a silicon controlled rectifier (SCR). Other semiconductor switching devices which have a gate turn on characteristic permitting turn on of the device by the application of a pulse to the gate electrode thereof, and which may be turned off by reducing the anode cathode current to below a holding value or by biasing, for example, the cathode of the device positive with respect to its anode could be used, of course.

Gate windings $Wg1$ through $Wg7$ are connected respectively between the gate and cathode electrodes of the corresponding switch devices. The purpose of the gate winding is to supply a gating pulse to the gate electrode of each controlled switch so that the switch may be rendered conductive to permit the passage of current from anode to cathode thereof. By the control of row switches S1 through S5 and the column switches S6 or S7, one or more of the visual display elements I1–I10 of the matrix may be selected for illumination. Thus, for example, if the display element I8 is desired to be energized, gating pulses would be applied through the gate windings $Wg3$ and $Wg7$ to render conductive the switching devices S3 and S7. This would permit current to pass from the positive source at the terminal T1, through the switching device S3 to the display element I8, with the return circuit being provided through the switching device S7 to the negative terminal T2.

The display element I8 will continue to be energized until the conductive path including the controlled switches S3 and S7 is opened. In order to accomplish the de-energization of the display elements, another gate control switching device S8 is provided, which may be similar to the devices S1–S7. The anode of the device S8 is connected through a resistor R1 to the terminal T1, with the cathode being connected to the terminal T2. A gate winding $Wg8$ is connected between the gate and cathode electrodes thereof and serves to control the turning on of the switch device S8. Resistors R2 and R3 are connected, respectively, between the terminal T1 and the anode electrode of the switching devices S6 and S7. Between the anode electrode of the switch devices S7 and S8 is connected a capacitor C1, while a capacitor C2 and a capacitor C3 are connected respectively between the anode electrodes of the switch devices S6–S8 and S6–S7.

The circuit including the switching device S8, the resistors R1, R2 and R3 and the capacitors C1, C2 and C3 comprises a turn off circuit for all of the display elements I1 through I10. If, for example, the element I8 is illuminated as described above, it is deenergized in the following manner. First observing that during the illuminated period of the element I8, with the semiconductive switching devices S3 and S7 conductive, the capacitor C1 between the anodes of the devices S7, S8 is charged from the positive source at terminal T1 through the resistor R1 to a positive polarity adjacent the switch S8, with the other side of the capacitor C1 being substantially at the potential of the terminal T2. The device I8 is then deenergized by turning off the switch S7. This is accomplished by turning on the device S8 by providing a proper polarity pulse to the winding $Wg8$. When the device S8 is turned on, the voltage across the capacitor C1 will appear across the switching device S7 with positive polarity side being connected to the cathode electrode thereof. Thus, a back biasing potential is applied across the device S7, with cathode being made positive with respect to the anode. This back biasing potential supplied from the capacitor C1 through the now conductive device S8 will thereby render the switching device S7 non-conductive. The switch S7 being turned off a conductor path will no longer be provided for current from the positive sources terminal T1, and therefore the display element I8 will be de-energized. Moreover, the switch S3 will be rendered non-conductive due to the reduction of the anode-cathode current therethrough when the switch S7 is turned off.

The controlled switch S8 will remain in its turned on conductive state until new information is desired to be read-out from the indicator unit. During the time that the switch S8 is conductive, the capacitor C1 will charge to a positive polarity at its side away from the switch S8 from the positive potential source through the resistor R3. Also the capacitor C2 will charge to a positive polarity at the side adjacent the anode of the switching device S6 through the resistor R2. Therefore, when either of the switching devices S6 or S7 is turned on, when that particular column display element is to be activated, a back biasing potential from either the capacitor C1 or C2 will be applied across the switching device S8 to turn it off and reset it for the next turn off cycle of the column controlled switches S6 or S7.

Thus, it may be seen from the above analysis that any particular one of the display elements I1 through I10 may be selected by energizing given row and column controlled switches. The display element energized can then be turned off by the gating on of the controlled switch S8, which causes the previously conductive column switching devices S6 or S7 to be turned off, which in turn de-energizes the illuminated display element and the associated row switching device S1–S5.

Figure 2:
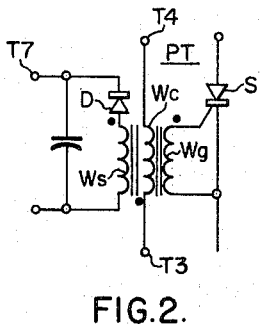
FIG. 2 is a schematic diagram showing a pulse transformer and associated circuitry controlling the switching devices in the indicator unit of FIGURE 1.

In FIGURE 2, a pulse transformer PT is shown which is utilized to control the gating on of the controlled rectifier devices S1 through S8 of FIGURE 1. A circuit such as shown in FIGURE 2 is provided for each of the controlled switching devices S1 through S8, however, each of these circuits is not shown in FIGURE 1 for the purposes of clarity. The pulse transformer PT includes a code winding Wc and the gate winding Wg for each of the controlled switching devices. The gate winding Wg is connected between the cathode and gate electrodes of the switching device S. For the time being the circuitry to the left of the code winding Wg will be disregarded. The code winding Wc has a pair of terminals T3 and T4 connected thereacross with the dotted end of the winding Wc being adjacent the terminal T3. The gate winding Wg has its dotted end connected adjacent the gate electrode of the controlled switching device S. With the dot convention as shown, when a positive polarity signal is generated at the dotted end of the code winding Wc, a positive polarity signal will appear at the dotted end of the gate winding Wg. Thus, by the application of current into the terminal T3, at the dotted end of the code winding Wc, a positive polarity gating signal will be induced at the dotted end of the gate winding Wg, at the gate electrode of the controlled switching device S, to turn on the device S. Thus, by completing a current path through the winding Wc into the dotted end of this winding, a gating signal will be applied at the gate electrode of the switching device S to render it conductive when desired.

Figure 3:
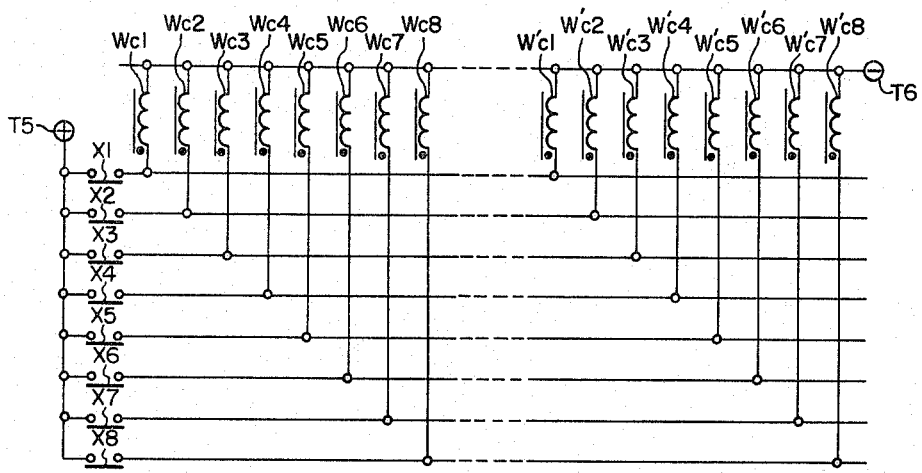
FIG. 3 is a schematic diagram showing connections for the code winding of the pulse trasformer so that the proper visual display elements of FIGURE 1 may be selected.

Referring to FIGURE 3, an array is shown for the connection of the code windings associated with each of the controlled switching devices S1 through S8. The code windings in FIGURE 3 are designated Wc1 to Wc8 in the circuit arrangement and are inductively coupled to the gate windings Wg1 through Wg8, respectively. Eight normally open contacts X1 through X8 are connected to the dotted ends of the windings Wg1 through Wg8, respectively. The contacts X1 through X8 may for example be relay contacts. The other end of each of the contacts X1 through X8 is connected to a terminal T5 which is to have connected thereto a source of positive potential, not shown. Upon the closing of any of the contacts X1 through X8 a completed circuit path will be provided from the positive terminal T5 through the contact into the dotted end of the respective code winding Wc1 through Wc8 to a negative terminal T6 connected at the undotted end of each of the control windings Wc1 through Wc8. By the closing of selected ones of the contacts X1 through X7, the associated one of one or several of the display lights I1 through I10 will be illuminated. To de-energize the selected indicator element or elements, the contact X8 is closed to energize the code winding Wc8 which in turn will apply a turn on signal through the gate winding Wg8 to the control device S8, which will then cause the previously conductive column switching device S6 or S7 to be rendered non-conductive by being back biased as explained above.

Additional arrays of code windings which would be associated with other display units similar to the unit shown in FIGURE 1 may be connected as illustrated in FIGURE 3. With the additional code windings W'c1 through W'c8 being connected in an analogous manner to the respective windings Wc1 through Wc8, the associated code windings in each of the indicator units will be connected in parallel. In this manner, a relatively high number of indicator units, may be connected as shown in FIGURE 3 utilizing the eight relay contacts X1 through X8. With the code windings of the various indicator units being connected in parallel, the closing of a contact X1, for example, will provide a current path to both the windings Wc1 and W'c1. This would ordinarily turn on the associated switching devices of each of the indicator units unless this is in some way prevented. This situation however is avoided by the incorporation of the selection circuitry of FIGURE 4 when a plurality of display units are to be used in an array with the code windings arranged as shown in FIGURE 3.

Figure 4:
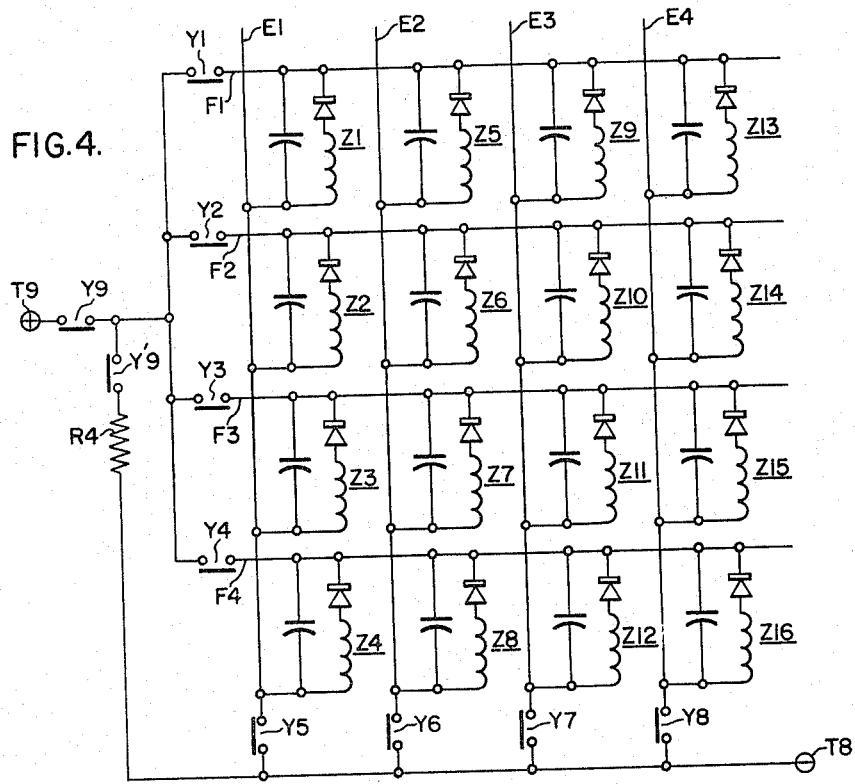
FIG. 4 is a schematic diagram showing a selection matrixing circuit to select a desired indicator unit when a number of indicator units are connected in an array.

First however refer again to FIG. 2 which will aid in explaining the operation of the selection circuitry of FIGURE 4. The pulse transformer PT of FIGURE 2 besides the windings Wg and Wc includes a third winding Ws. The winding Ws could be termed a selection winding and has a dotted end corresponding to the dot convention for the windings Wg and Wc so that a positive polarity voltage at the dotted end of the code winding Wc will induce a positive polarity signal at the dotted ends of both the gate winding Wg and the selection winding Ws. A diode D is connected to the dotted end of the winding Ws at its anode electrode. Between the cathode of the diode D and the undotted end of the winding Ws is connected a capacitor C. As will be shown for the following, by controlling the charge on the capacitor C, whether the controlled switching device S will be turned on by the application of a signal to the code winding Wc, can be controlled.

Assume initially that the capacitor C is uncharged. In the uncharged state, the connection of the capacitor C cross the selection winding Ws will act as a short circuit to the winding Ws. Thus it will appear to the pulse transformer PT as though it has a shorted winding in its secondary. With the capacitor uncharged when a signal is applied to the terminal T3 and thus to the code winding Wc, the pulse induced in the winding Ws will be shorted through the capacitor C. No pulse or a very low magnitude pulse will be induced at the dotted end of the gate winding Wg which will be of an insufficient magnitude to trigger the controlled switch S to its conductive state. Therefore, with the capacitor C in its uncharged state, signals applied to the code winding Wc will be ineffective to turn on the controlled switch S since a not large enough signal will be generated in the winding Wg to gate on the device S. The reason for this is that substantially all of the energy is being dissipated in the shorted winding.

Assume now that the capacitor C is charged to a positive polarity on its side adjacent to the cathode of the diode D. This may be effected, for example, by applying a positive polarity voltage source to the terminal T7. Current from the terminal T7 will be blocked by the diode from passing through the winding Ws. With the capacitor C charged to positive polarity as just described, the winding Ws will not appear to a pulse induced therein as a shorted secondary winding on the pulse transformer PT, but rather will appear as a relatively high impedance secondary winding. Thus, by applying a signal to the core winding Wc, a positive polarity signal will be induced at the dotted end of the gate winding Wg of sufficient magnitude to gate on the control switching device S to its conductive state. The relatively high impedance of the secondary circuit including the winding Ws and the capacitor C will permit a sufficient amount of energy to be transferred to the gate winding Wg to effect the switching on of the switch S.

After the switch S has been turned on by the mechanism as described with reference to FIGURE 1, to reset the pulse transformer PT for the next cycle of information, the capacitor C will be discharged by suitable means which is shown in FIGURE 4 and will be described below. However, it should be noted that the control of the charged state of the capacitor C permits the selection of a given controlled switch S which may either be turned on or maintained in its turned off state depending on this charged state.

Figure 5:
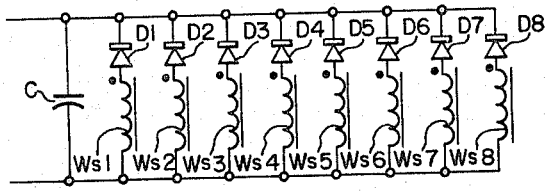
FIG. 5 is a schematic diagram showing the complete connection for each of the selection circuits as shown in FIGURE 4.

Referring now to FIGURE 4, there is shown a four by four matrix of selection elements Z1 through Z16. Each of the selection elements is shown schematically in FIGURE 4 and would comprise a circuit as shown in FIGURE 5. FIGURE 5 shows that each of the selection elements Z1 through Z16 includes eight selection windings Ws1 through Ws8 connected in series respectively with eight diodes D1 through D8. Across the selection windings and diodes is connected the capacitor C. Each of the selection elements Z1 through Z16, including the eight selection windings, serves to control one indicator unit as shown in FIGURE 1, with each of the selection windings Ws1 through Ws8 being associated with corresponding controlled switching devices S1 through S8. By the selection of any one of the selection elements Z1 through Z16, a corresponding indicator unit as shown in FIGURE 1 may be selected so that the display elements I1 through I10 of that indicator unit may then be energized to display desired visual read-out information.

The selection element Z1 through Z4, Z5 through Z8, Z9 through Z12 and Z13 through Z16 are connected respectively in four columns by having one end connected to column lines E1, E2, E3 and E4, respectively. The other end of the elements are connected in four rows with the elements Z1, Z5, Z9 and Z13 connected to a row line F1, the elements Z2, Z6, Z10, Z14 connected to a row line F2, the elements Z3, Z7, Z11 and Z15 connected to a row line F3 and the elements Z4, Z8, Z12 and Z16 connected to a row line F4. The row lines F1 through F4 are connected respectively to one end of four normally open contacts Y1 through Y4. The other end of the normally opened contacts Y1 through Y4 is commonly connected at a junction J1. The column lines E1 to E4 are connected through four normally open contacts Y5 through Y8 to a common line H, which has one end connected at a terminal T8 which is to be connected to a source of negative potential, not shown. A source of positive potential, not shown, is applied at a terminal T9. The terminal T9 is connected to the junction J1 by a normally open relay contact Y9. Mechanically ganged to the contact Y9 is normally closed contact Y'9 which has one end connected to the junction J1 and the other end connected to a resistor R4. The resistor R4 has its other end connected to the common line H.

Assume initially that the contacts Y1 through Y9 are in their normally open state and the contact Y'9 is in its normally closed state and the capacitors C in each of the selection elements Z1 through Z16 are uncharged. In order to select a given one of the selection elements, the contact Y9 is closed and the contact Y'9 is opened, with the desired row and column contacts being closed to select a given one of the selection elements in the matrix. For example, if the selection element Z7 is to be activated, the contacts Y3 and Y6 are closed. A current path is then provided through the selection element Z7 from the positive terminal T9, through the closed contact Y9, the contact Y3, the elements Z7 and the closed contact Y6 to the negative terminal T8. With the conductor path being so provided to the selection element Z7, the capacitor associated therewith is charged to a positive polarity, while all of the other capacitors of the selection elements Z1 through Z6 and Z8 through Z16 remain in an uncharged state.

The selection element Z7 includes eight selection windings associated with eight pulse transformers for a given indicator unit of FIGURE 1. Thus, by the charging of the capacitor of the selection element Z7, the indicator unit associated therewith may be energized to output display information by pulsing selected of the code windings Wc1 through Wc7, as shown in FIGURE 3. the indicator unit associated with the selection element Z7 will be the only one of the display units of an array which will be responsive to the activation of the selected code windings. This is due to the fact that only the capacitor of a selection element Z7 is charged and therefore presents a relatively high impedance to a pulse being applied to the associated code winding of that pulse transformer. The other capacitors of the other selection elements being in an uncharged state will appear as a short circuit to pulses being applied thereto from the parallelly connected code windings in the array of FIGURE 3, and therefore will not apply sufficient magnitude signals to the gate electrodes of the associated controlled switch devices to render them conductive. Only the selected control switches associated with the selection circuit Z7 will have sufficient magnitude pulses applied thereto to be turned on and to complete the necessary circuit to energize the display elements I1 through I10 of the read-out indicator unit of FIGURE 1. Of course, other of the sixteen selection elements could be selected at the same time in order to permit other indicator units to display read-out information simultaneously if desired.

After the selection element has been selected and the desired information has been supplied to the respective indicator units and it is desired to reset the selection circuit for new information, the contacts Y1 through Y8 are closed, the contact Y9 is opened and the contact Y'9 is closed. This permits any previously charged capacitors in the selection elements to discharge through the closed contact Y'9 and the resistor R4 to the negative terminal T8. After the capacitors have discharged the contacts Y1 through Y9 are then reopened and the contact Y9 closed with the selection circuit of FIGURE 4 then being reset to select the indicator units which are desired to supply the read-out information for the next cycle of operation.

It can thus be seen that through the use of the selection elements Z1 through Z16, which each include the selection windings for an indicator unit as shown in FIGURE 1 that a given indicator unit may be selected under the control of the contacts Y1 through Y8–Y'9. The particular read-out information is then supplied to the individual display elements I1 through I10 of the selected indicator unit through the closing of selected ones of the contacts X1 through X7 as shown in FIGURE 3. The system as thus described provides for the connection of a multiplicity of indicator units of FIGURE 1 with a minimum number of controlled contact devices to accomplish the necessary read-out of information from the computer system.

Although the present invention has been described in a certain degree in particularity in should be understood that the present disclosure has been made only by way of example and that numerous changes in the details of construction and circuitry and in the combination and arrangement of parts, elements and components may be resorted to without departing from the spirit and scope of the present invention.

What is claimed is:

1. An indicator unit comprising, a plurality of indicator display elements to be selectively energized to provide a visual display, a plurality of controlled switching devices being so arranged to permit selected of said elements to be energized when placed in a given conductive state, gating means for placing selected of said controlled switching devices in a given conductive state, storing means for developing a biasing potential when said indicator display elements are energized, and a turn off switching device when placed in a given conductive state to apply said biasing potential to selected of said switching devices placed in said given conductive state so that the selected of said display indicator elements are deenergized.

2. An indicator unit comprising, a plurality of indicator display elements arranged in a matrix to be selectively energized to provide a visual display, a plurality of controlled switching devices including a control circuit and being connected in said matrix to permit selected of said elements to be energized and placed in a given conductive state, gate control means connected in the control circuit of each of said controlled switching devices for selectively placing selected of said controlled switching devices in a given conductive state, energy storing means for developing a biasing potential when said indicator display elements are energized, and a turn off control switching device when placed in a given conductive state to apply said biasing potential to selected of said switching devices placed in said given conductive state so that the selected of said display indicator elements are deenergized.

3. An indicator unit comprising, a plurality of indicator display elements arranged in a matrix of rows and columns to be selectively energized to provide a visual display, a controlled switching device including a control circuit and being connected in each of said rows and columns to permit selected of said elements to be energized when placed in a given conductive state, pulse transformer means including a gate winding connected in the control circuit of each of said control switching devices to be selectively energized to place selected of said controlled switching device in a given conductive state, energy storing means for developing a biasing potential when said indicator display elements are energized, and a turn off control switching device when placed in a given conductive state to apply said biasing potential to selected of said switching devices placed in said given conductive state so that the selected of said display indicator elements are deenergized.

4. An indicator unit comprising, a plurality of display indicator elements arranged in a matrix of rows and columns to be selectively energized to provide a visual display, a controlled switching device including a gate circuit for turning on said device and being connected in each of said rows and columns of said matrix to permit selection of said elements to be energized when turned on; a pulse transformer including a gate winding connected in the gate circuit of each of said controlled switching devices and a code winding to be selectively energized to turn on selected of said controlled switching devices; energy storage means for developing a biasing potential when said display indicator elements are energized; and a turn off controlled switching device operatively connected between said energy storage means and the controlled switching devices connected in the columns of said matrix, said turn off device being operative when turned on to apply said biasing potential to the column controlled switching devices that are turned on to thereby turn off these devices and so deenergize the previously energized display elements.

5. In an indicator system the combination of: a plurality of indicator units, each of said indicator units including a plurality of display elements to be selectively energized to provide a visual read-out display; a plurality of controlled switching devices each including a gate circuit and being so arranged to permit selected said display elements to be energized within a given indicator unit when rendered conductive transformer means associated with each of said controlled switching devices, each of said transformer means including code winding means to supply turn on pulses to each of said gate circuits for rendering conductive the associated controlled switching device, said transforming means also including selection winding means; capacitive means operatively connected to each of said selection windings to be selectively charged; and means for selectively charging the capacitive means associated with a given selection winding of a selected indicator unit so that the selected indicator units will be conditioned to supply visual display information from the display elements therein, while display units associated with selection windings wherein the associated capacitive means is uncharged will be non-responsive to supply display information.

6. In an indicator system for displaying visual information the combination of: a plurality of indicator units arranged in a matrix, each of said indicator units including a plurality of display elements to be selectively energized to provide a visual read-out display; a plurality of controlled switching devices each including a gate circuit and being so arranged to permit selected of said display elements to be energized within a given indicator unit when rendered conductive; a pulse transformer associated with each of said controlled switching devices; each of said pulse transformers including a gate winding connected in the gate circuit of each of said controlled switching devices, a code winding to supply turn on pulses through said gate winding for rendering conductive the associative controlled switching device, and a selection winding; a capacitor connected across each of said selection windings to be selectively charged; and means for selectively charging the capacitor associated with a given selection winding of a selected indicator unit so that the selected indicator units will be conditioned to display visual information from the display elements therein, while display units associated with selection windings wherein the associated capacitor is uncharged will be non-responsive to display visual information.

7. A selection array comprising: a plurality of selection elements each including a selection winding, a unidirectional device connected in series with said selection winding and a capacitor connected across said selection winding and said unidirectional device; means for selecting a given of said selection elements by placing the associated ones of said capacitors in a given state and for placing the associated ones of said capacitors in another state of those elements that are not selected; code winding means to supply input signals to said selection element; and output winding means to provide an output signal only from given selection elements wherein the associated capacitor is placed in the given state.

8. A selection array comprising: a plurality of selection elements each including selection winding means, a unidirectional device operatively connected in series with said selection winding means and a capacitor operatively connected across said selection winding means and said unidirectional device; means for selecting a given of said selection elements by charging the associated one of said capacitors and for placing in an uncharged condition those elements that are not selected; code winding means to supply input signals to said selection element; and output winding means to provide an output signal only from given selection elements wherein the associated capacitor is charged.

9. A selection array comprsing: a plurality of selection elements each including a selection winding, a diode connected in series with said selection winding and a capacitor connected across said selection winding and said diode; means for selecting a given of said selection elements by charging the associated one of said capacitors and for maintaining in an uncharged condition those elements that are not selected; code winding means to supply input signals to said selection element; and output winding means to provide an output signal only from given selection elements wherein the associated capacitor is charged.

References Cited

UNITED STATES PATENTS

| | | | |
|---|---|---|---|
| 3,235,841 | 2/1966 | Bauwens | 340—166 |
| 3,251,036 | 5/1966 | Smith | 340—166 |
| 3,260,996 | 7/1966 | Muller | 340—116 |
| 3,292,036 | 12/1966 | Colton et al. | 340—324 |
| 3,329,949 | 7/1967 | Colton et al. | 315—334 |

JOHN W. CALDWELL, *Primary Examiner.*

THOMAS B. HABECKER, *Examiner.*

A. J. KASPER, *Assistant Examiner.*